(12) United States Patent
Choi et al.

(10) Patent No.: US 6,828,705 B1
(45) Date of Patent: Dec. 7, 2004

(54) VIBRATION MOTOR

(75) Inventors: Joon Choi, Kyungki-do (KR); Ki Hyung Kim, Seoul (KR)

(73) Assignee: Samsung Electro-Mechanics Co., Ltd., Kyungki-do (KR)

(*) Notice: Subject to any disclaimer, the term of this patent is extended or adjusted under 35 U.S.C. 154(b) by 0 days.

(21) Appl. No.: 10/699,673

(22) Filed: Nov. 4, 2003

(30) Foreign Application Priority Data

Jun. 20, 2003 (KR) .................................. 10-2003-0040306

(51) Int. Cl.[7] .............................. H02K 7/06; H02K 7/10
(52) U.S. Cl. ......................................... 310/81; 310/90
(58) Field of Search ............................... 310/81, 67 R, 310/89–91

(56) References Cited

U.S. PATENT DOCUMENTS

| | | | | |
|---|---|---|---|---|
| 5,579,188 A | * | 11/1996 | Dunfield et al. | 360/99.08 |
| 5,834,870 A | * | 11/1998 | Tokushima et al. | 310/90 |
| 5,942,833 A | * | 8/1999 | Yamaguchi | 310/268 |
| 6,091,175 A | * | 7/2000 | Kinsinger | 310/90 |
| 6,246,143 B1 | * | 6/2001 | Yamaguchi | 310/233 |
| 6,326,711 B1 | * | 12/2001 | Yamaguchi et al. | 310/81 |
| 2001/0040412 A1 | * | 11/2001 | Yamaguchi | 310/81 |
| 2004/0084980 A1 | * | 5/2004 | Yamaguchi et al. | 310/81 |

* cited by examiner

*Primary Examiner*—Thanh Lam
(74) *Attorney, Agent, or Firm*—Lowe Hauptman Gilman & Berner, LLP

(57) ABSTRACT

Disclosed is a vibration motor having an improved support structure between a rotor for generating eccentric rotation and a stator for supporting rotation of the rotor. In order to realize the above objects, an aspect of the invention provides a vibration motor comprising: a rotor having an eccentric mass; a stator for supporting rotation of the rotor; a stationary shaft inserted into a rotation center of the rotor and having upper and lower ends supported by the stator; a bearing having upper and lower ends smaller in cross sectional area than a central portion of the bearing, and coupled with the rotor at the rotation center thereof to contact an outer periphery of the stationary shaft; a first washer mounted on an inner and upper central portion of the stator for elastically supporting the stationary shaft, and being in contact with an upper face of the stationary shaft; and a second washer being in contact with a lower end of the bearing and mounted on the stator around the stationary shaft to support the rotor.

15 Claims, 4 Drawing Sheets

VIBRATION MOTOR

BACKGROUND OF THE INVENTION

1. Field of the Invention

The present invention relates to a vibration motor having an improved support structure between a rotor for generating eccentric rotation and a stator for supporting rotation of the rotor.

2. Description of the Related Art

A communication device generally uses a bell and vibrator to notify a user of call incoming. In a vibration mode, generally a small-sized vibration motor is actuated transferring driving force to a housing of the communication device to vibrate the communication device.

The vibration motor currently applied to a mobile telephone is discriminated into a flat type vibration motor and a cylinder type vibration motor. The flat type vibration motor has a relatively simple vibration structure, e.g., for rotating a weight which is placed inside the motor. The flat type vibration can be fabricated thin so that components of a mobile phone can be miniaturized. Owing to these advantages, application of the flat type vibration motor is gradually spreading.

FIG. 1 is a sectional view of a conventional flat type vibration motor. The conventional flat type vibration motor comprises a stator (i.e., stator assembly) as a stationary member and a rotor (i.e., rotor assembly) as a rotary member. That is, a lower board 101 is bonded to an upper face of a circular flat bracket 100, and an annular magnet 102 is attached concentrically to an upper face of the lower board 101 in an equal fashion.

The bracket 100 is covered from above with a housing 110, and the bracket 100 and the housing 110 are connected by a central shaft 105. The shaft 105 has a rotor 120, as shown in FIG. 2, which includes a bearing 121, an upper board 122, a commutator 123, winding coils 124, a weight 125 and an insulator 126.

The upper board 122 is a circular printed circuit board, and when powered from the commutator 123 which is attached to the underside of the upper board 122, supplies different electric power to each of the winding coils 124 through a pattern formed in the top and the underside thereof. The commutator 123 has a number of segments which are buried in the underside of the upper board 122 around the center of rotation at a predetermined interval, exposing contact faces thereof. The winding coils 124 are arranged flush with each other on a common radius and opposed to the magnet 102 placed under the winding coils 124. One of the winding coils 124 is supplied with electric power having a polarity different from that of the other one of the winding coils 124.

The weight 125 is generally made of high specific gravity material such as tungsten (W), and attached to the upper board 122 in a position opposite to the winding coils 124 on the upper board 122 to determine the eccentricity of the motor. The insulator 126 is a component for ensuring secure mutual attachment among the bearing 121, the winding coils 124 and the weight 125 on the upper board 122 as well as and imparting insulation to the same. At this time, the stator and the rotor 120 are electrically connected to each other by a pair of brushes 127, which have their lower ends fixed to the lower board 101 and their upper ends in slidable contact with the commutator 123.

The above vibration motor is referred to as a brush type vibration motor which has drawbacks that the brush 127 causes mechanical abrasion or generates electric sparks while passing through the interval of the segments during rotation of the rotor. This situation causes byproducts functioning as a major factor of damaging the stability of electric contacts, which in turn may generate noises or degrade the performance of the vibration motor. Then, the lifetime of the vibration motor may be also shortened.

In order to overcome drawbacks of the brush type vibration motor as above, there is currently being studied a brushless vibration motor which does not have the brush or the commutator. The brushless vibration motor is so designed that an Integrated Circuit (IC) chip is employed for actuation of the motor and a magnet is placed in a rotor unlike the existing brush type motor.

FIG. 3 is a sectional view of a conventional brushless vibration motor. In FIG. 3, a rotor includes a yoke 202, a magnet 203 mounted on the underside of the yoke 202 and a weight 205 mounted on one end of the yoke 202. A central portion of the yoke 202 is fixedly coupled with a rotary shaft 204 so that the rotary shaft 204 projects downward.

In FIG. 3, the stator includes a bearing 208 which supports rotation of the rotary shaft 204 while contacting the rotary shaft 204 of the rotor. The bearing 208 is inserted into a projected portion which is formed in a central portion of an underlying bracket 209, and a board 206 is placed on the bracket 209. A coil 210 is attached on the board 206, and an IC chip 211 placed on the board 206 supplies AC power to the coil 210.

The conventional brushless vibration motor is so designed that the rotary shaft 204 is fixed to the rotor. Then, during operation of the vibration motor, the rotor vertically moves to collide against a housing 201 and the bracket 209, making loud noises as well as having bad effect to the lifetime of the housing and the bracket.

Furthermore, the rotor of the brushless vibration motor has a mass larger than that of the rotor of the conventional brush type vibration motor. When the rotary shaft is coupled with the rotor like the brush type vibration motor, load is concentrated to the bracket thereby degrading the reliability of the bracket.

SUMMARY OF THE INVENTION

The present invention has been made to solve the foregoing problems and it is therefore an object of the present invention to provide a vibration motor which comprises a bearing coupled with a rotor and a stationary shaft supported by a stator in order to ensure rotation of the rotor more stable, reduce noises and guarantee reliability.

It is another object of the invention to provide a vibration motor which has an improved structure of a bearing of a rotor and a washer for supporting the bearing in order to sufficiently endure the axial load of the rotor and thus elevate rotation rate while reducing power consumption.

According to an aspect of the invention for realizing the above objects, there is provided a vibration motor comprising: a rotor having an eccentric mass; a stator for supporting rotation of the rotor; a stationary shaft inserted into a rotation center of the rotor and having upper and lower ends supported by the stator; a bearing having upper and lower ends smaller in cross sectional area than a central portion of the bearing, and coupled with the rotor at the rotation center thereof to contact an outer periphery of the stationary shaft; a first washer mounted on an inner and upper central portion of the stator for elastically supporting the stationary shaft, and being in contact with an upper face of the stationary shaft; and a second washer being in contact with a lower end of the bearing and mounted on the stator around the stationary shaft to support the rotor.

Preferably, the rotor includes a coil and a commutator having a plurality of segments for alternating electric power to the coil, and wherein the stator includes a magnet mounted in a position corresponding to the position of the coil of the rotor and a brush contacting the commutator for applying electric power. Also preferably, the stator includes a coil and an Integrated Circuit (IC) chip for alternating electric power to the coil, and wherein the rotor includes a magnet.

Preferably, the stator has a recess formed in an inner and upper central portion thereof, and the first washer is positioned to cover the recess. Also preferably, the stator has a projected column in an inner and lower central portion thereof for receiving the stationary shaft, and wherein the second washer is placed on a top of the projected column.

Preferably also, the projected column is coupled with a bush for applying clamping force, and the second washer is placed on a top of the bush.

Also preferably, the first and second washers have an outside diameter larger than that of the bearing, the bearing has tapered upper and lower ends, or the bearing has rounded edges in upper and lower ends.

According to another aspect of the invention for realizing the above objects, there is provided a vibration motor comprising: a magnetic bracket mounted with a coil and an Integrated Circuit (IC) chip for supplying AC power to the coil, the bracket having a projected column formed with a through hole in a central portion of the projected column; a housing for covering the bracket, the housing having an internal space and a recess formed in an upper central portion of the housing; a stationary shaft having a first end portion inserted into the projected column and a second end portion inserted into the recess; a yoke having at least one magnet mounted on an underside of the yoke, the magnet being magnetized into a plurality of poles, and a weight for introducing eccentric mass attached to the yoke; a bearing having upper and lower ends smaller in cross sectional area than a central portion of the bearing, and coupled with the rotor at the rotation center thereof to contact an outer periphery of the stationary shaft; a first washer arranged in the recess for elastically supporting the stationary shaft, and being in contact with an upper face of the stationary shaft; and a second washer being in contact with a lower end of the bearing and mounted on the stator around the stationary shaft to support the rotor.

Preferably, the coil and the IC chip for supplying AC power to the coil are provided on an inner lower face of the housing, and the first and second washers have an outer diameter smaller than that of the bearing.

Also preferably, the bearing has tapered upper and lower ends, or rounded edges formed in upper and lower ends. Preferably, the projected column is coupled with a bush for applying clamping force, and the second washer is placed on a top of the bush.

The vibration motor of the invention includes a contact structure having the stationary shaft arranged in a contact portion in the side of the stator, in which the rotor rotates in contact with the stator, and the bearing coupled in the side of the rotor. In addition, the vibration motor may further include a structure which enables the washer in the side of the rotor and the washer for supporting the bearing to contact each other at a small area. The vibration motor having the shaft structure of the invention is preferably a brushless vibration motor, but not limited thereto. On the contrary, the vibration motor of the invention may include a brush.

The brushless motor has semi-permanent lifetime since it to the letter does not have a brush or a commutator used in a DC motor. In comparison to the DC motor, the brushless motor comprises the rotor having the permanent magnet and the stator having the coils. The brushless motor further comprises a sensor for detecting the rotation angle of the rotor since it is required to regulate flow of electric power supplied to the coils according to the rotation angle of the rotor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
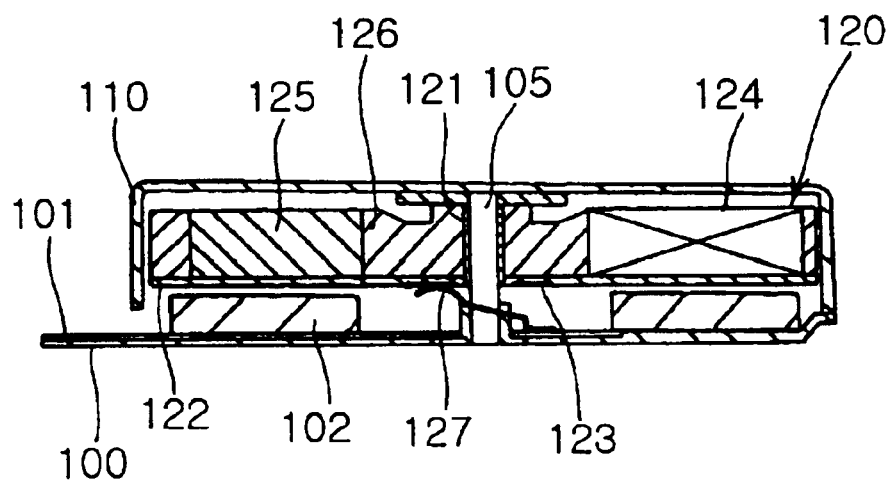
FIG. 1 is a sectional view of a conventional flat type vibration motor.
Figure 2:
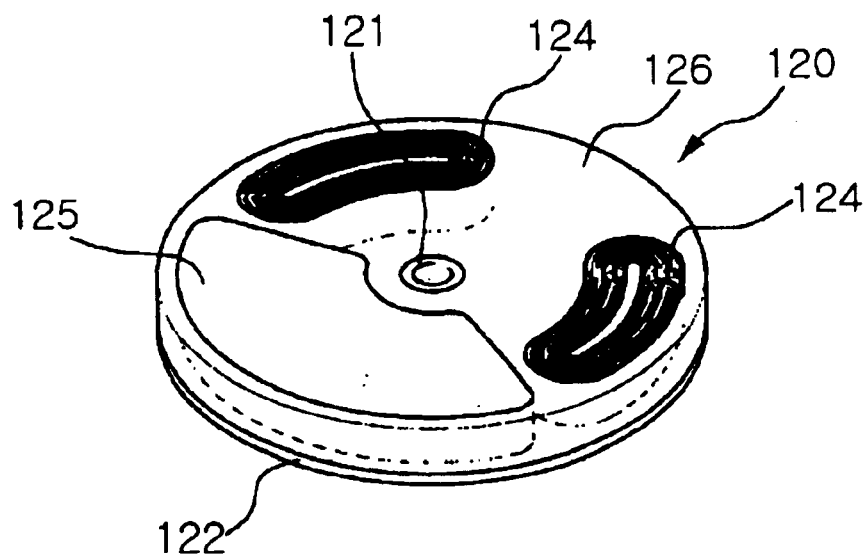
FIG. 2 is a perspective view of a rotor in FIG. 1.
Figure 3:
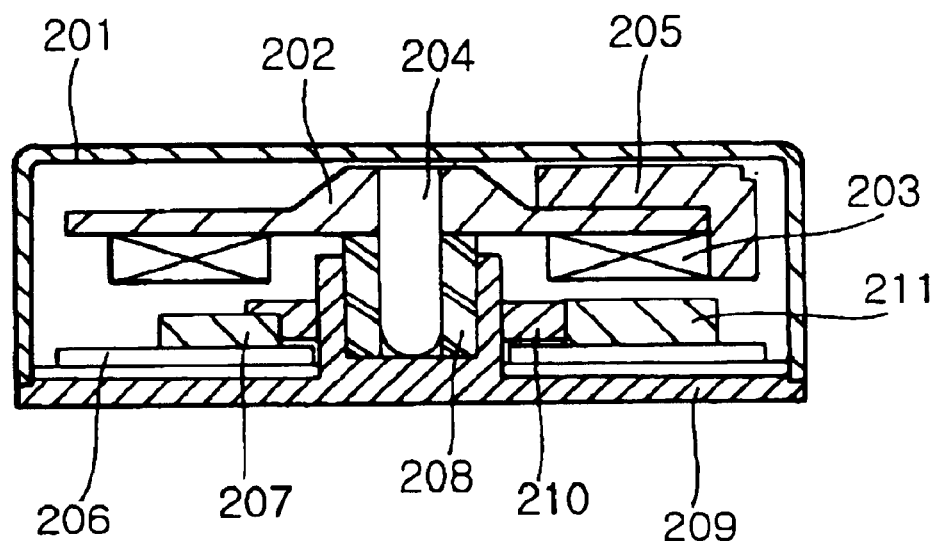
FIG. 3 is a sectional view of a conventional brushless vibration motor.
Figure 4:
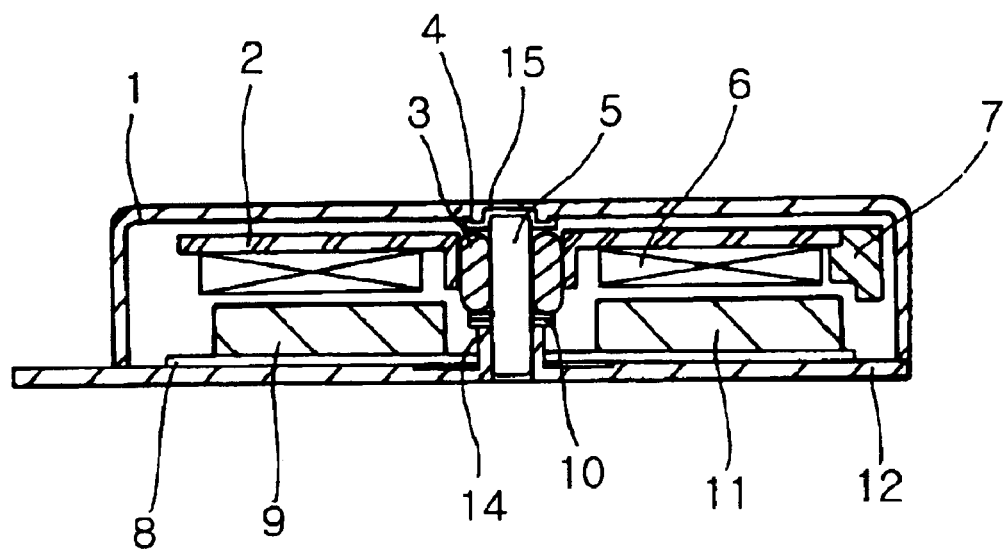
FIG. 4 is a sectional view of a vibration motor of the invention.
Figure 5:
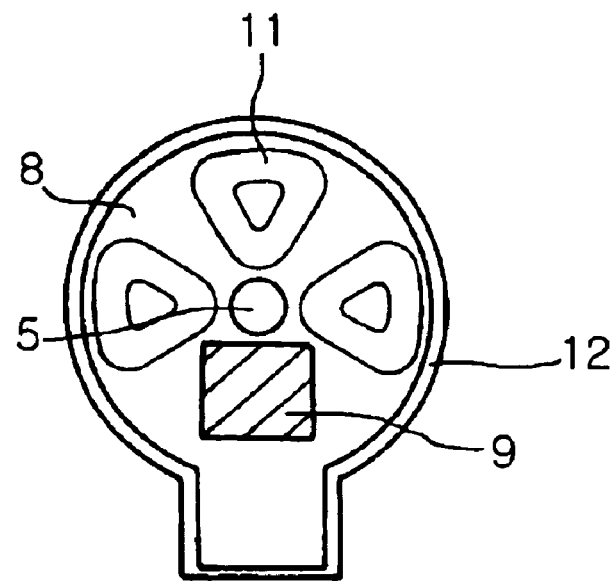
FIG. 5 is a plan view of a stator of the vibration motor of the invention.
Figure 6:
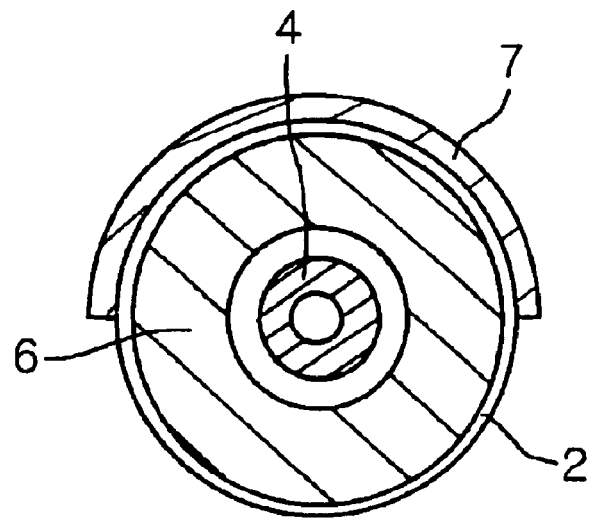
FIG. 6 is a bottom view of a rotor of the vibration motor of the invention.
Figure 7:
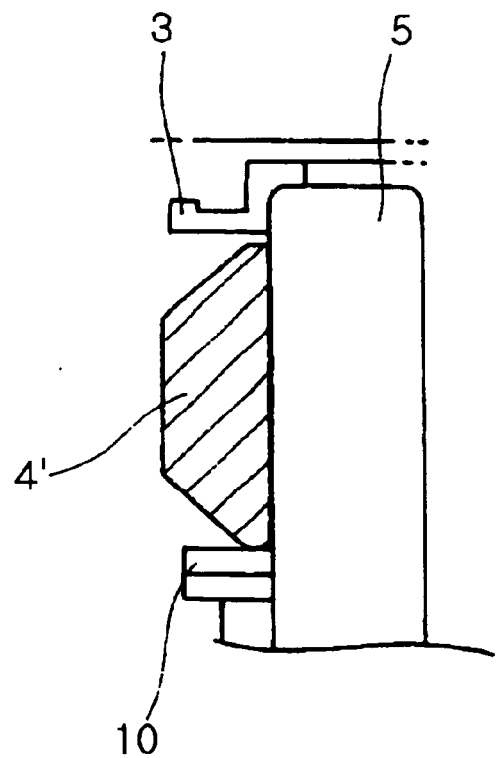
FIG. 7 is a side view of an alternative configuration to a bearing of the vibration motor of the invention.
Figure 8:
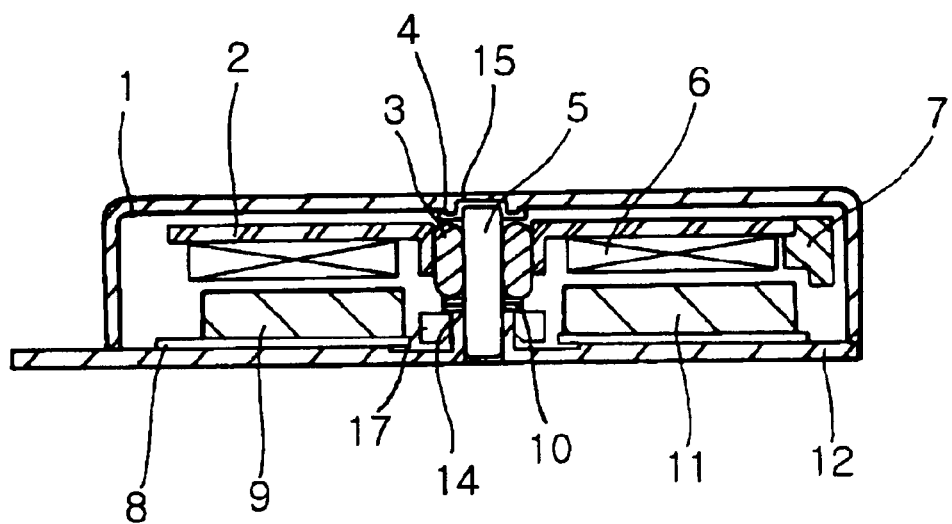
FIG. 8 is a sectional view of the vibration motor in FIG. 4 on which a bush is mounted.

The following detailed description will present a brushless vibration motor according to a preferred embodiment of the invention in reference to the accompanying drawings, in which FIG. 4 is a sectional view of a vibration motor of the invention, FIG. 5 is a plan view of a stator of the vibration motor of the invention, FIG. 6 is a bottom view of a rotor of the vibration motor of the invention, FIG. 7 is a side view of an alternative configuration of a bearing of the vibration motor of the invention; and FIG. 8 is a sectional view of the vibration motor in FIG. 4 on which a bush is mounted.

Stator

The vibration motor of the invention includes a rotor of eccentric mass and a stator fixed for supporting rotation of the rotor. FIG. 4 is a sectional view of the vibration motor of the invention.

The stator includes a bracket 12 arranged in a lower portion of the stator, a housing 1 for covering the bracket 12, a stationary shaft 5 pressed into the bracket 12, a board 8 placed on the bracket 12, coils 11 attached to the board 8 and an Integrated Circuit (IC) chip 9 attached to the board 8.

The bracket 12 also has a column 14 projected from a central portion thereof, which has a hole for insertion of the stationary shaft 5 therethrough. The bracket 12 is made of magnetic material in order to intensify the magnetic force of a magnet which is placed over the bracket 12. That is, the bracket 12 is made of magnetic material such as iron so that the magnetic force of the magnet influences the coil.

The bracket 12 together with the above components mounted thereon constitutes a lower structure of the vibration motor, which is wrapped in the housing 1 from above to form an internal space of the vibration motor. The column 14 is projected upward from the central portion of the bracket 12, and the hole of the column 14 has a diameter equal to or slightly smaller than that of the stationary shaft 5 so that the stationary shaft 5 can be press-fit into the hole.

The bracket 12 is covered with the housing 1 from above. The housing 1 is designed to form the internal space together with the bracket 12 so that the rotor rotates and generates vibration within the internal space. The housing 1 has a recess 15 in a central portion thereof for fixedly receiving the upper end of the stationary shaft 5.

The stationary shaft 5 is in the form a cylinder, with the lower end fixedly press-fit into the projected column 14 of the bracket 12 and the upper end inserted into the central recess 15 of the upper housing. As a result, the stationary shaft 5 is supported at both ends.

Further, the stationary shaft 5 which is inserted into the projected column 14 can be fixed thereto at stronger axial clamping force with the assistance of a bush 17 as shown in FIG. 8, which is a ring-shaped member.

A Flexible Printed Circuit (FPC) or a Printed Circuit Board (PCB) is attached to an upper face of the bracket 12, and the coils 11 (or at least one coil) are attached to the FPC or PCB has as shown in FIG. 5. As shown in FIG. 5, the vibration motor has three coils 11 mounted on the FPC or PCB, but is not limited thereto. The coils 11 are connected with an external power supply (not shown) to cooperate with the magnet attached to the rotor in order to enable rotation of the rotor under the magnetic force.

Electric power is applied to the coils 11 via the IC chip 9, which supplies AC power to the coils. Hall effect sensors or Hall sensor (not shown) may be placed respectively in central spaces of the coils 11 in order to detect rotation of the rotor. Alternatively, a Hall sensor may be installed inside the IC chip 9.

Rotor

The rotor includes a yoke 2, at least one magnet 6 attached to the yoke 2, a weight 7 attached to the yoke 2 and a bearing 4 mounted on a rotation center of the yoke 2, and generates vibration while rotating about the stationary shaft 5 of the stator.

The yoke 2 is in the form of a circular disk and made of magnetic material such as iron in order to react upon the magnetic force of the magnet 6. The yoke 2 also has a through hole for receiving the stationary shaft 5 therethrough. The diameter of the through hole is larger than that of the stationary shaft 5 so that the through hole can contact the stationary shaft 5 via the bearing 4.

The magnet 6 which is attached to the underside of the yoke 2 has a plurality of magnetized poles and a shape of circular ring as shown in FIG. 6. The weight 7 is mounted on a portion of the yoke 2 so that the rotor has eccentric mass. The weight 7 is generally made of tungsten, and mounted on an outer periphery of the yoke to surround the half of the yoke. FIGS. 4 and 6 show the yoke 2 having the weight 7 mounted thereon.

The bearing 4 is mounted on a central portion of the yoke 2 in such a manner that an inner face of the bearing 4 is in contact with the stationary shaft 5 and an outer face of the bearing 4 is in contact with the yoke 2. The bearing 4 is preferably made of metal.

The rotor can rotate under the force of a magnetic field generated between the coils 11 of the stator and the magnet 6 of the rotor. In rotation, vibration occurs resulting from the eccentric mass of the weight 7 of the rotor.

As set forth above, the vibration motor of the invention is designed to use the stationary shaft 5 supported by the housing 1 and the bracket 12 so that the rotor rotates about the stationary shaft as a center of rotation. This is discriminated from the conventional construction in which the rotary shaft mounted on the rotor is inserted into the bearing of the bracket for rotation thereof.

Because the conventional rotary shaft is so designed that only one end of the rotary shaft is inserted into the bracket for rotation of the rotary shaft, the load of the rotor is directly transferred to the bracket and the rotary shaft is readily damaged resulting from vibration during rotation. On the contrary, where the both ends of the stationary shaft are fixed according to the present invention, the load of the rotor is transferred to the stationary shaft which in turn distributes the load to the housing and the bracket. Then, the housing and the bracket of the vibration motor are not readily damaged and reliability is ensured to the vibration motor.

Bearing and Washer

The bearing 4 is installed in the rotor as set forth above so that the rotor can rotate about the rotary shaft 5 which is supported to the stator via the bearing 4.

The bearing 4 is mounted on a central portion of the yoke 2, with the inner face being in contact with the stationary shaft 5 and the outer face being in contact with the yoke. The bearing 4 also may be made of metal. In general, the bearing is fabricated through sintering of powder of Cu, Fe, Sn, Pb and C and impregnation of oil. Then, in actuation of the motor, impregnated oil leaks from the bearing under the pressure difference resulting from rotation of the rotor so that the bearing lubricates the shaft and surrounding portions thereof while supporting rotation of the rotor.

The bearing is generally arranged to surround the stationary shaft 5 for about 60% of thereof in length, and may receive the stationary shaft in a press-fit fashion. Alternatively, the bearing may be formed around the stationary shaft through injection molding. There are advantages that the coupling force between the bearing and the yoke is uniform and the process is simple. Whereas, there are drawbacks that it is difficult to set up equipments and fabricate a mold.

The bearing 4 contacts a first washer 3 and a second washer 10 which are fixed in the side of the stator. The washers are typically made of metal and provided to prevent direct contact between the lower end of the bearing and the bracket as well as to axially support the bearing. Further, the washers are designed to prevent friction or displacement occurring during direct contact between the stationary shaft 5 and the housing.

The first washer 3 placed for covering the recess 15 of the housing 1 has a central portion pressed by the upper end of the stationary shaft 5 and projects in the form of an arc toward the outer periphery of the stationary shaft 5. Further, the second washer 10 may be seated on the top of the bush 17, as shown in FIG. 8, mounted on the column 5.

Because the magnet is attached to the rotor in the brushless vibration motor of the invention, the rotor in the brushless vibration motor of the invention is heavier than that in the conventional vibration motor. Further, the brushless vibration motor of the invention needs a structure of axially supporting the rotor since the lower end of the rotor is not elastically supported by the brush.

Thus, the invention provides washers in upper and lower sides of the bearing, and in particular, the upper and lower ends of the bearing have a cross sectional area smaller than that of a central portion of the bearing as shown in FIG. 4. As the bearing is so formed to reduce the cross sectional area of the upper and lower ends, the friction area between the bearing and the washer is also reduced to decrease the quantity of load transferred to the bracket and the housing through the washers.

FIG. 7 illustrates an exemplary bearing structure for supporting the rotor in the vibration motor of the invention. As shown in FIG. 7, the bearing 4' is so formed that the upper and lower ends are reduced in cross sectional area with respect to other areas. Therefore, the upper and lower ends of the bearing 4 may have rounded edges as shown in FIG. 4, whereas the upper and lower ends of the bearing 4' may be tapered as shown in FIG. 7.

It is preferred that the outside diameter of the first and second washers 3 and 10 is smaller than the overall outside diameter of the bearing in order to prevent the washers from projecting beyond the outside diameter of the bearing. This resultantly reduces potential interference between the washers and other components.

As set forth above, the vibration motor of the present invention adopts the bearing in the side of the rotor, the bracket of the stator and the stationary shaft supported by the housing in order to suitably distribute the rotation load of the rotor together with its self-load by using the stationary shaft supported at both ends, thereby preventing damage and breakage, reducing noises and ensuring rotation of the rotor more stable.

Furthermore, the present invention improves a structure of the bearing of the rotor and the washer for supporting the bearing to decrease the friction area of the washer thereby reducing the load transferred to the bracket and the housing via the washer. Decrement in the friction area also reduces noises from the vibration motor. Moreover, the lifetime of the vibration motor can be improved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A vibration motor comprising:
   a rotor having an eccentric mass;
   a stator for supporting rotation of the rotor;
   a stationary shaft inserted into a rotation center of the rotor and having upper and lower ends supported by the stator;
   a bearing having upper and lower ends smaller in cross sectional area than a central portion of the bearing, and coupled with the rotor at the rotation center thereof to contact an outer periphery of the stationary shaft;
   a first washer mounted on an inner and upper central portion of the stator for elastically supporting the stationary shaft, and being in contact with an upper face of the stationary shaft; and
   a second washer being in contact with a lower end of the bearing and mounted on the stator around the stationary shaft to support the rotor.

2. The vibration motor as set forth in claim 1, wherein the rotor includes a coil and a commutator having a plurality of segments for alternating electric power to the coil, and wherein the stator includes a magnet mounted in a position corresponding to the position of the coil of the rotor and a brush contacting the commutator for applying electric power.

3. The vibration motor as set forth in claim 1, wherein the stator includes a coil and an Integrated Circuit (IC) chip for alternating electric power to t he coil, and wherein the rotor includes a magnet.

4. The vibration motor as set forth in claim 1, wherein the stator has a recess formed in an inner and upper central portion thereof, and wherein the first washer is positioned to cover the recess.

5. The vibration motor as set forth in claim 1, wherein the stator has a projected column in an inner and lower central portion thereof for receiving the stationary shaft, and wherein the second washer is placed on a top of the projected column.

6. The vibration motor as set forth in claim 5, wherein the projected column is coupled with a bush for applying clamping force, and the second washer is placed on a top of the bush.

7. The vibration motor as set forth in claim 1, wherein the first and second washers have an outside diameter larger than that of the bearing.

8. The vibration motor as set forth in claim 1, wherein the bearing has tapered upper and lower ends.

9. The vibration motor as set forth in claim 1, wherein the bearing has rounded edges in upper and lower ends.

10. A vibration motor comprising:
    a magnetic bracket mounted with a coil and an Integrated Circuit (IC) chip for supplying AC power to the coil, the bracket having a projected column formed with a through hole in a central portion of the projected column;
    a housing for covering the bracket, the housing having an internal space and a recess formed in an upper central portion of the housing;
    a stationary shaft having a first end portion inserted into the projected column and a second end portion inserted into the recess;
    a yoke having at least one magnet mounted on an underside of the yoke, the magnet being magnetized into a plurality of poles, and a weight for introducing eccentric mass attached to the yoke;
    a bearing having upper and lower ends smaller in cross sectional area than a central portion of the bearing, and coupled with the rotor at the rotation center thereof to contact an outer periphery of the stationary shaft;
    a first washer arranged in the recess for elastically supporting the stationary shaft, and being in contact with an upper face of the stationary shaft; and
    a second washer being in contact with a lower end of the bearing and mounted on the stator around the stationary shaft to support the rotor.

11. The vibration motor as set forth in claim 10, wherein the coil and the IC chip for supplying AC power to the coil are provided on an inner lower face of the housing.

12. The vibration motor as set forth in claim 10, wherein the first and second washers have an outer diameter smaller than that of the bearing.

13. The vibration motor as set forth in claim 10, wherein the bearing has tapered upper and lower ends.

14. The vibration motor as set forth in claim 10, wherein the bearing has rounded edges in upper and lower ends.

15. The vibration motor as set forth in claim 10, wherein the projected column is coupled with a bush for applying clamping force, and the second washer is placed on a top of the bush.

* * * * *